United States Patent
Pomaranski et al.

(10) Patent No.: US 7,272,733 B2
(45) Date of Patent: Sep. 18, 2007

(54) METHOD OF PROVIDING DYNAMIC POWER REDUNDANCY BASED ON A DIFFERENCE OF CURRENT POWER UNITS AND CURRENTLY NEEDED POWER UNITS

(75) Inventors: Ken Gary Pomaranski, Roseville, CA (US); Andrew Harvey Barr, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 824 days.

(21) Appl. No.: 10/672,101

(22) Filed: Sep. 26, 2003

(65) Prior Publication Data

US 2005/0071690 A1  Mar. 31, 2005

(51) Int. Cl.
G06F 1/26 (2006.01)
(52) U.S. Cl. .................. 713/320; 713/330; 713/340
(58) Field of Classification Search ............... 713/300, 713/320, 340, 330
See application file for complete search history.

(56) References Cited

U.S. PATENT DOCUMENTS

| | | | |
|---|---|---|---|
| 6,055,647 A * | 4/2000 | Lacombe et al. ............. 714/14 |
| 6,153,946 A | 11/2000 | Koch et al. | |
| 6,418,557 B1 | 7/2002 | Otani | |
| 6,434,236 B1 | 8/2002 | Zorzella | |
| 6,477,483 B1 | 11/2002 | Scarlat et al. | |
| 6,664,657 B2 * | 12/2003 | Hailey ......................... 307/52 |
| 6,735,704 B1 * | 5/2004 | Butka et al. ................ 713/300 |
| 2002/0145895 A1 * | 10/2002 | Liu ............................. 363/65 |
| 2004/0179334 A1 * | 9/2004 | Kinnard et al. ............. 361/687 |
| 2006/0123256 A1 * | 6/2006 | Cornelius ................... 713/300 |

* cited by examiner

Primary Examiner—Thomas Lee
Assistant Examiner—Malcolm D Cribbs

(57) ABSTRACT

One embodiment disclosed relates to a method of providing dynamic power redundancy for a system. A number of power supply units, n, that are presently in an up state is tracked. In addition, a number of power supply units, N, that are presently needed to supply power to the system is dynamically determined. If a margin of safety corresponding to a difference between n and N reaches a minimum acceptable level, then action is taken to increase the margin of safety.

14 Claims, 5 Drawing Sheets

METHOD OF PROVIDING DYNAMIC POWER REDUNDANCY BASED ON A DIFFERENCE OF CURRENT POWER UNITS AND CURRENTLY NEEDED POWER UNITS

BACKGROUND OF THE INVENTION

1. Field of the Invention

The present invention relates generally to power supplies for electronics and computers.

2. Description of the Background Art

Supplying power with back-up or redundancy to computer systems or servers is desirable or required in certain applications. For example, it is becoming increasingly more important to provide mechanisms that minimize unscheduled "down time" in data centers. The term "high availability" (HA) computing is often used to refer to computer systems that include these mechanisms.

HA mechanisms are provided at many levels. For example, a data center may have redundant computer systems so that if one system fails, the workload can be seamlessly shifted to another system. In addition, data may be stored in a disk array subsystem that allows any single disk drive to fail without affecting the ability of the disk array subsystem to continue operating.

One of the most important aspects of HA computing is ensuring that computer circuits receive an uninterrupted supply of DC power. Typically, a loss of DC power is caused by a loss of AC power to the AC-to-DC power supplies, or a failure of an AC-to-DC power supply. Uninterruptible AC power supplies address the problem of AC power loss by providing a constant supply of AC power to AC-to-DC power supplies. Typically, uninterruptible power supplies are implemented using rechargeable batteries, and in some cases, generators.

Redundant AC-to-DC power supplies address the problem of AC-to-DC power supply failure. In the prior art, redundant power supplies have been deployed on a "per system" basis. Typically, one redundant power supply is provided for each system, which is known in the art as "N+1" redundancy.

Computer systems also use DC-DC conversion since in many cases it is more efficient to provide AC-DC conversion to a single high DC voltage (typically 48V), then bus this voltage to second stage down-converters. In many cases, these DC-DC conversion devices are also required to be redundant.

SUMMARY

One embodiment of the invention pertains to a method of providing dynamic power redundancy for a system. A number of power supply units, n, that are presently in an up state is tracked. In addition, a number of power supply units, N, that are presently needed to supply power to the system is dynamically determined. If a margin of safety corresponding to a difference between n and N reaches a minimum acceptable level, then action is taken to increase the margin of safety.

Another embodiment of the invention relates to an apparatus for providing power redundantly to a system. The apparatus includes a plurality of power supply units configured to supply power to a system or subsystem, at least one current sensor, a power-consumption tracking unit, and supply state tracking registers. The electrical current drawn by the system is measured by the at least one current sensor. The supply state tracking registers are coupled to the power supply units and configured to hold a state variable for each said supply unit.

Another embodiment of the invention relates to a power subsystem for providing dynamic power redundancy to system hardware. The power subsystem includes means for tracking a number of power supply units, n, that are presently in an up state. It also includes means for determining dynamically a number of power supply units, N, that are presently needed to supply power to the system hardware. Logic circuitry is also included for generating an action alert to increase a margin of safety corresponding to a difference between n and N if the margin of safety reaches a minimum acceptable level.

DETAILED DESCRIPTION

Figure 1A:
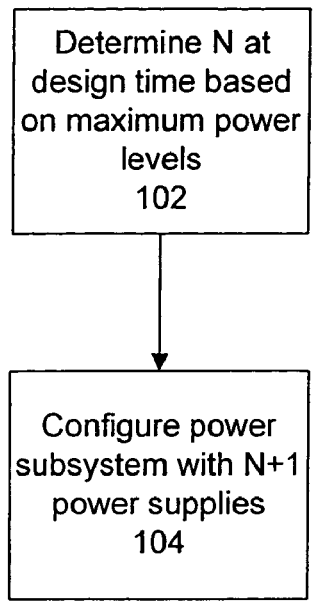
FIG. 1A is a flow chart depicting a typical conventional method of configuring a redundant power system.

Consider an example wherein a redundant power subsystem has multiple power supplies of equivalent power supplying capacity. The power subsystem supports a system of devices. Consider an example wherein the number of power supplies that are up and running is "n", and the system of devices requires "N" power supplies to run without redundancy. If n=N−1, then there is insufficient power to run the system and potential for highly undesirable device failures. On the other hand, if n=N+1, then there is one supply over the minimum needed to run the system. More generally, if n=N+x, then there are "x" supplies over the minimum needed to run the system.

A conventional redundant power system typically has both N and x statically determined during the system design process. Because the power subsystem may conceivably have to accommodate the maximum load of the system, including components that may be added in the future, the power subsystem is typically designed for the worst possible case (highest possible load). In other words, N is typically calculated during design by summing the maximum power of all components that could be in the system.

Another prior technique for determining "N" uses a look-up table (LUT) indexed by the serial number of the devices supported by the power subsystem. The LUT holds a maximum power level drawn by each device. N may then be calculated by summing these maximum power levels, dividing by the power level supplied per power supply, and rounding up to the next nearest number.

The number of redundant power supplies "x" is typically determined at design time based on cost, space and uptime considerations. Usually, because of board real estate and cost considerations, the power subsystem is designed only as N+1 (i.e. with x=1).

Applicants believe that the above-described conventional power subsystems have substantial disadvantages. First, because of overly conservative assumptions, the power system is typically over-designed at high cost (both in terms of space and expense). The assumptions are overly conservative since components do not generally draw maximum power at all times, and, in many cases, the system is not fully loaded. Second, because the statically-determined N overestimates the actual power requirements of the system, there is typically an over-reporting of n=N states.

Regarding the latter, an n=N condition indicates that the system is being run with sufficient power, but without an extra available supply for redundancy. Such a condition occurs, when a power subsystem loses one or more power supply(ies) due to some type of failure such that the subsystem is running with only N working supplies. If, as typical, x=1, then the system will report an n=N condition when a single power supply fails or otherwise becomes unavailable.

When the power subsystem is running at n=N, action is due in order to gain the redundancy back. The reason that redundancy needs to be restored when n=N is that, otherwise, the loss of one more supply (i.e. the transition from n=N to n=N−1) may result in system crashes and/or data corruption, both of which are to be avoided at nearly any cost in mission critical environments.

In a computer system (for example, at a data center), the restoration to an n>N state is typically accomplished by either (a) temporarily shutting down the system to fix or change the failing component (cold swapping) or (b) performing some type of hot swap operation to replace the failing power component while the system remains online (i.e. is kept running with power). Either of these two procedures, while better than a system crash or data corruption, still requires some form of human intervention. Human intervention disadvantageously incurs costs. In addition, the former procedure (where the system is temporarily shut down) reduces uptime of the system and is hence quite undesirable. Therefore, the occurrence of an n=N condition is generally disadvantageous.

FIG. 1A is a flow chart depicting a typical conventional method of configuring a redundant power system. The number of supplies to run the system without redundancy, N, is determined 102 at design time based on conservative assumptions of maximum power needs. Thereafter, the power subsystem is configured 104 with N+1 power supplies to provide a level of redundancy. More generally, N+x power supplies could be configured, but typically N+1 supplies are configured due to space and cost considerations.

Figure 1B:
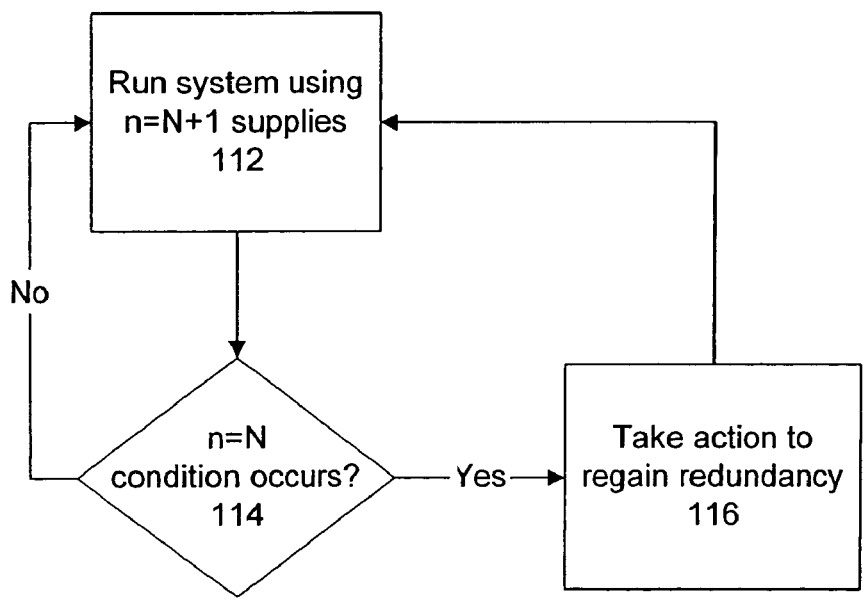
FIG. 1B is a flow chart depicting a conventional method of operating and maintaining a power subsystem with the typical N+1 redundancy.

FIG. 1B is a flow chart depicting a conventional method of operating and maintaining a power subsystem with the typical N+1 redundancy. Per FIG. 1A, the system is configured to normally run 112 using n=N+1 power supplies. If no supplies fail and so no n=N conditions occur 114, then the system continues to run 112 with n=N+1 supplies. However, if a supply fails so that an n=N condition occurs 114, then an action 116 is taken to restore the redundancy. As described above, the action 116 may comprise either cold or hot swapping of a failed component or supply. Thereafter, N+1 redundancy is restored, and the system again runs 112 with a level of redundancy.

Figure 2:
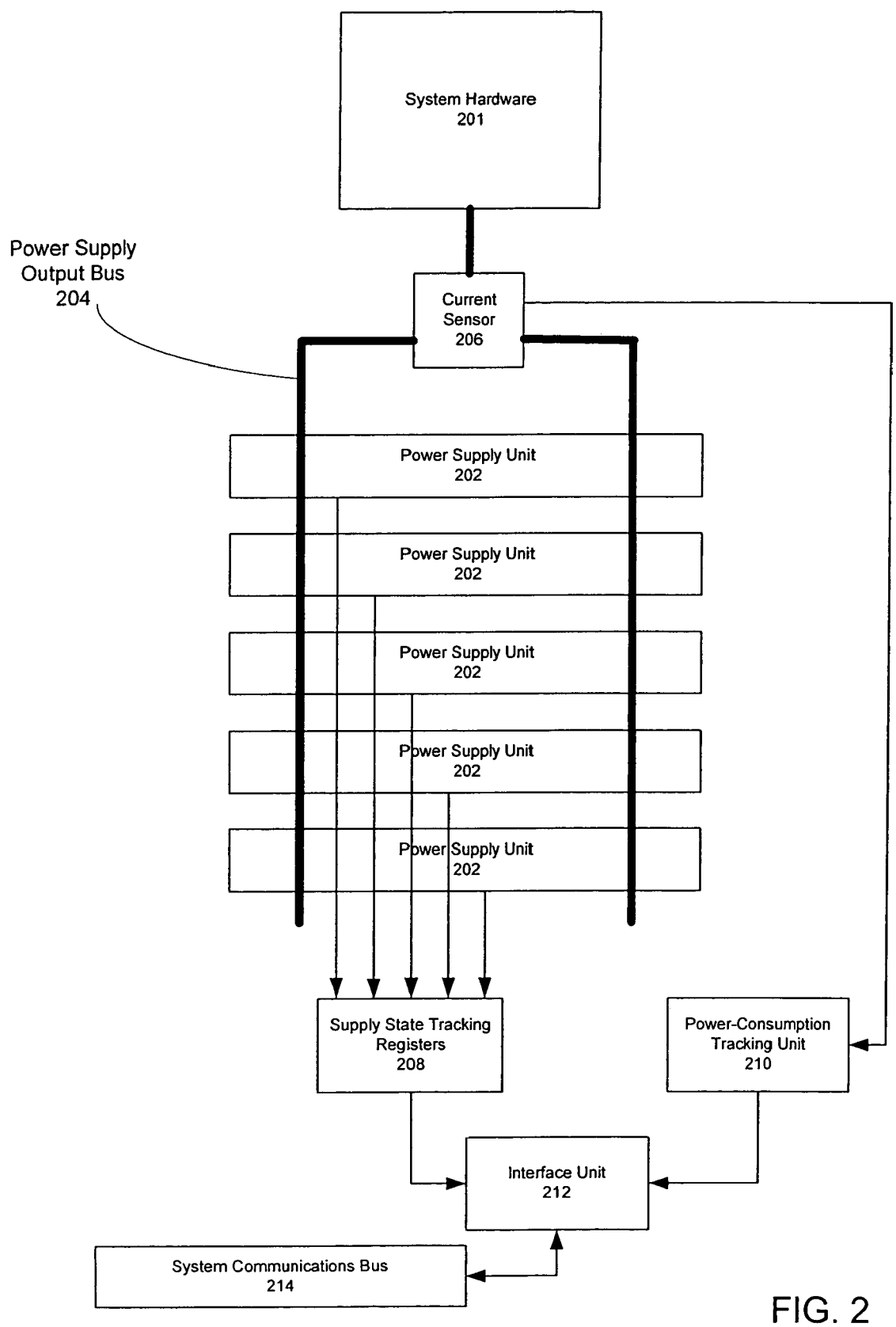
FIG. 2 is a schematic diagram depicting an apparatus for dynamic power redundancy using online current measurement in accordance with an embodiment of the invention.

FIG. 2 is a schematic diagram depicting an apparatus for dynamic power redundancy using online current measurement in accordance with an embodiment of the invention. The apparatus, in the configuration shown, comprises a power subsystem which provides power to system hardware 201. The power subsystem includes multiple power supply units 202, one or more power supply output bus(es) 204, current sensor 206, supply state tracking registers 208, power-consumption tracking unit 210, interface unit 212, and system communications bus 214.

The system hardware 201 typically comprises computer devices and electronics that require power to operate. For example, the system may comprise a rack with a number of servers or other devices mounted therein. Numerous types of system hardware 201 may be powered redundantly by the power subsystem.

The power supply units 202 may comprise AC-to-DC converters that receive AC power from an external source. Alternatively, they may comprise DC-to-DC converters that receive DC power at one voltage level and convert it to a second voltage level to be utilized by the system hardware 201. The power subsystem is configured with multiple power supply units 202. In one embodiment, each power supply unit 202 may have the same or equivalent output voltage and power supplying capability (wattage capacity). The number of supplies 202 may be determined at design time depending on the expected power needs and level of redundancy desired, for example, in accordance with the process described below in relation to FIG. 4A.

The power supplies 202 have their outputs coupled to one or more power supply output bus(es) 204. Multiple buses 204 may be utilized for purposes of redundancy. If one of the buses fails, another bus can still route power from the supplies 202 to the target system devices 201. In the example illustrated in FIG. 2, the power subsystem is shown as configured with two such output buses 204. With multiple output buses, power transistors (not shown) may be used as controllable switches to selectively couple the supply units to the bus bars. Hence, for example, if one bus bar becomes shorted, the power supplies may be switched to another bus bar.

A current sensor or current sense unit 206 may be configured such that it measures the electrical current going through it to power the system hardware 201. The current sensor 206 may comprise an in-line type device where all current to the system hardware 201 flows through the device. Alternatively, the current sensor 206 may comprise a passive type device, such as a magnetic-based current sensor wrapped around a bus bar leading to the system hardware. The current sensor 206 outputs the current measurement signal to the power-consumption tracking unit 210. If multiple power supply output buses 204 are used, then the current sense unit 206 may also be configured to include circuitry (such as switches) to electrically isolate the bus bars from each other so that if an electrical short on one bus bar does not result in shorting all the bus bars.

The power-consumption tracking unit 210 may include an analog-to-digital converter (ADC) that is configured to receive the current measurement signal and to convert the analog signal to digital data. The power-consumption tracking unit 210 may also include logic that calculates one or more measures from the current measurement data. For example, the logic may be configured to determine a peak or maximum current drawn by the system hardware over a specified period of time. The specified period of time may comprise, for example, the preceding 24 hours, the preceding week, or some other period of time. The logic may also be configured calculate other dynamic statistical measures, such as the average current supplied to the system hardware over a period of time.

The supply state tracking registers 208 are coupled to the power supply units 202. The status or state of each of the supplies 202 may be communicated to and kept in the registers 208. In one embodiment, each supply may be in either an up state (supplying power), a down state (not supplying power), or a fault state (not functioning properly).

The interface unit 212 comprises a subsystem that is configured to receive data and information from the power-consumption tracking unit 210 and from the supply state tracking registers 208. The data and information may be kept in a register set within the interface unit 212. The register set may be configured to store the state of each power supply from the supply state tracking registers 208 and to store one or more dynamic statistical measure(s) from the consumption tracking unit 210. The interface unit 212 may be coupled to a system communications bus 214 and may be configured to make available and communicate the data and information to a computer system by way of the bus 214. The computer system may include a user interface that allows a user to monitor the status of the power subsystem. In addition, the local computer system may be configured to communicate the data and information to a remote computer system for remote monitoring of the status of the power subsystem.

Figure 3:
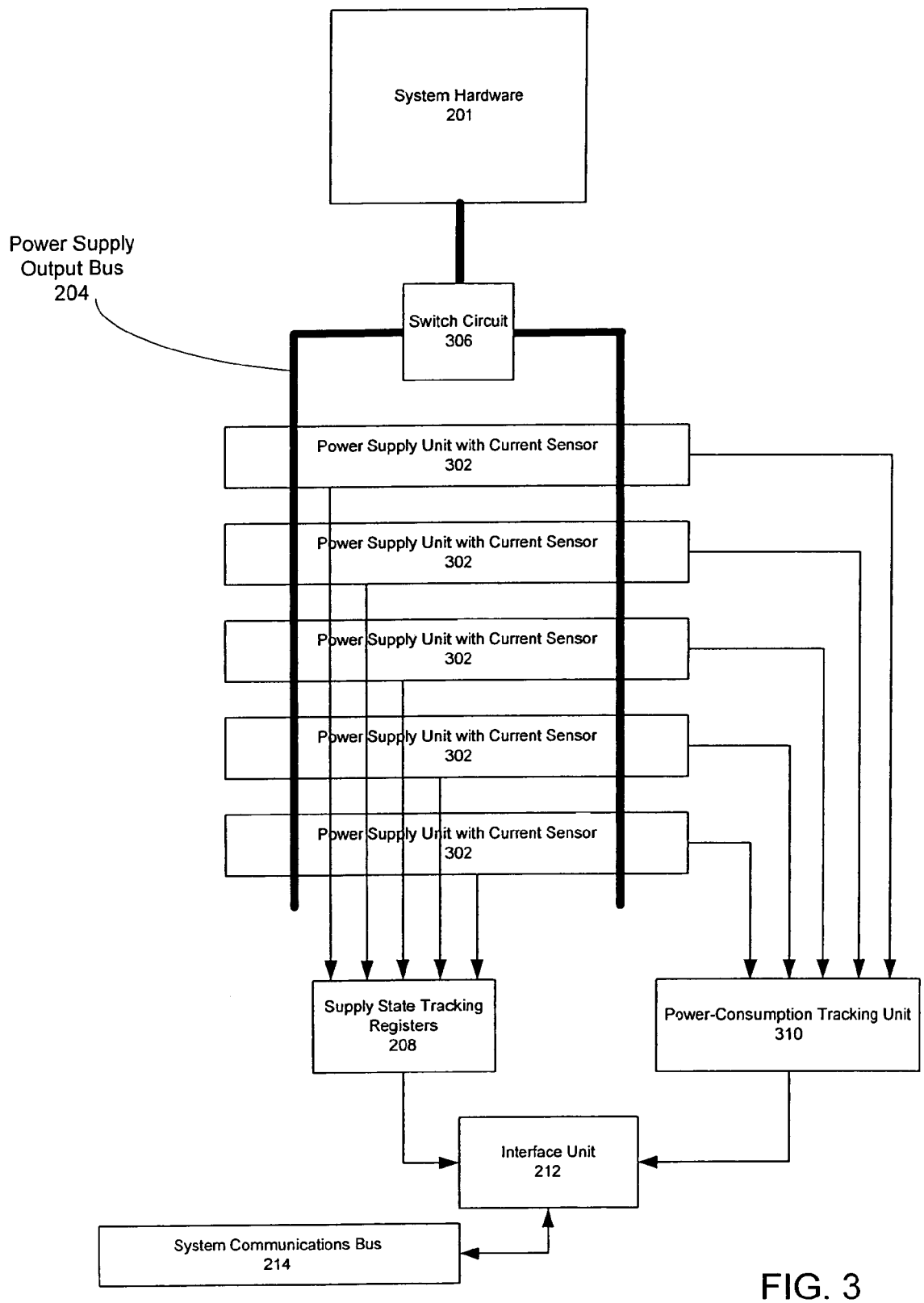
FIG. 3 is a schematic diagram depicting an alternate configuration of an apparatus for dynamic power redundancy using online current measurement in accordance with an embodiment of the invention.

FIG. 3 is a schematic diagram depicting an alternate configuration of an apparatus for dynamic power redundancy using online current measurement in accordance with an embodiment of the invention. The apparatus is similar to the one described in relation to FIG. 2 with some differences.

In the apparatus of FIG. 3, each power supply unit 302 includes a current sensor. The current sensor measures the electrical current provided by that power supply unit 302.

With current sensors embedded in the power supply units, a separate current sensing unit 206 is not necessary. Instead, a simpler switch circuit 306 may be utilized to couple the power supply output buses 204 to the system hardware 201. In one implementation, the switch circuit 306 may be configured to controllably switch either output bus bar 204 so that current is directed from that bus bar to the system hardware 201.

The power-consumption tracking unit 310 may include an analog-to-digital converter (ADC) that is configured to receive the multiple current measurement signals from the various supplies 302 and to convert each analog signal to digital data. The consumption tracking unit 310 may also include logic that sums together the current measurement data from the various supplies 302 to generate a total measure of the current supplied to the system hardware 201. The consumption tracking unit 310 may also include logic that calculates one or more measures from the data. For example, the logic may be configured to determine a peak or maximum current supplied to the system hardware over a specified period of time. The specified period of time may comprise, for example, the preceding 24 hours, the preceding week, or some other period of time. The logic may also be configured calculate other dynamic statistical measures, such as the average current supplied to the system hardware over a period of time.

Figure 4A:
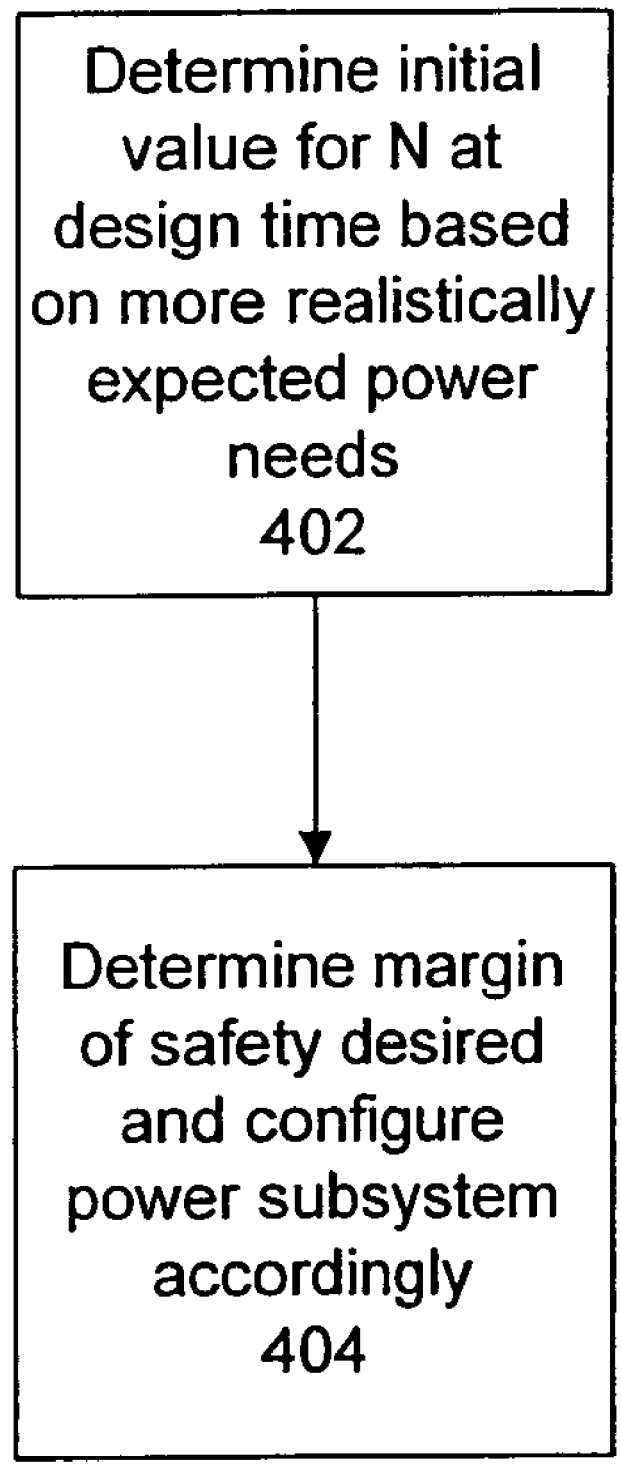
FIG. 4A is a flow chart depicting a method for configuring a redundant power system in accordance with an embodiment of the invention.

FIG. 4A is a flow chart depicting a method for configuring a redundant power system in accordance with an embodiment of the invention. In this method, an initial value for the number of supplies to run the system without redundancy, N, is determined 402 at design time based on more realistic expected assumptions of expected power needs. In other words, the assumptions do not have to be worst possible case assumptions of maximum power needs. More realistic expected power needs may be used at design time, because the actual power consumption of the system will be dynamically measured. The power subsystem may then be configured 404 with N+x power supplies to provide a desired margin of safety or level of redundancy. The higher x, the higher the estimated margin of safety designed into the system. In accordance with a preferred embodiment of the invention, x would be two or more (not just one extra supply).

Note that, for the same system hardware to be supported, the N calculated under the method of FIG. 4A will usually be less than the N calculated under the method of FIG. 1A. Furthermore, for the same system hardware to be supported, the N+x power supplies configured according to FIG. 4A may be less in number than the N+1 configured according to FIG. 1A. This is true even if x is greater than one. This is because N determined under FIG. 4A is usually less than N determined under FIG. 1A.

Figure 4B:
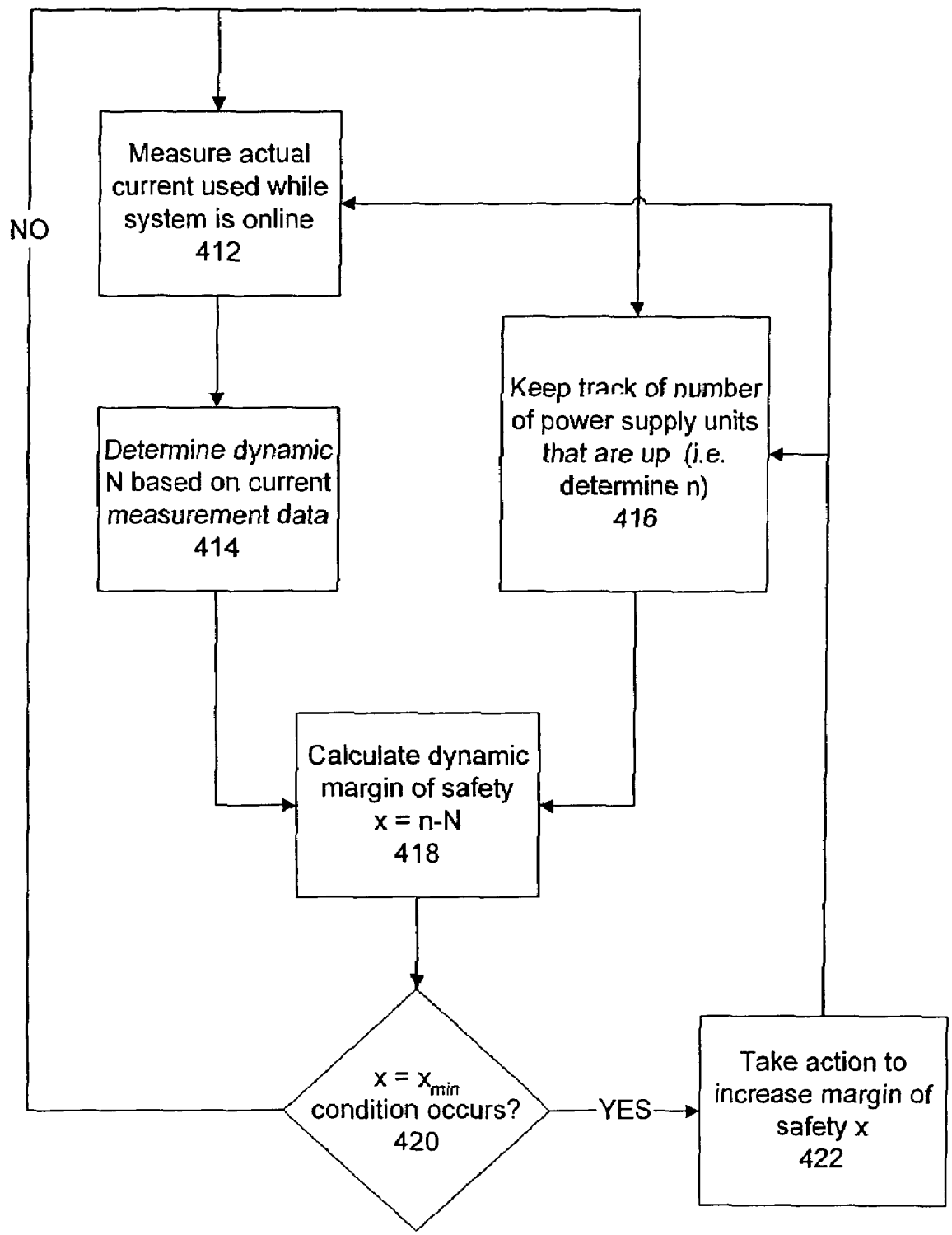
FIG. 4B is a flow chart depicting a method of operating and maintaining a power subsystem in accordance with an embodiment of the invention.

FIG. 4B is a flow chart depicting a method of operating and maintaining a power subsystem in accordance with an embodiment of the invention. After being configured per FIG. 4A, the power subsystem is used to power the system hardware. While the system is online, the actual current being used by the system hardware is measured 412. For example, a current sensing unit 206, such as in FIG. 2, may be utilized, or current sensors integrated with the power supplies 306, such as in FIG. 3, may be used.

Based on the current measurement data, a dynamic determination 414 is made of N, wherein N comprises the number of power supplies needed to power the system hardware (rounding up, but without redundancy). The dynamic determination may be made using logic circuitry in the power subsystem. In one implementation, N is dynamically calculated using the following formula.

N=round_up (PEAK_CURRENT_DRAW/MAX_CURRENT_PER_SUPPLY)

PEAK_CURRENT_DRAW is a dynamic variable representing the maximum current drawn by the system hardware over a specified period of time. MAX_CURRENT_PER_SUPPLY is a static variable representing the maximum current that each power supply is capable of providing. Per the equation, PEAK_CURRENT_DRAW is divided by MAX_CURRENT_PER_SUPPLY. Finally, round_up represents the function of rounding up to the nearest integer to obtain N. Since PEAK_CURRENT_DRAW is dynamically calculated, N is also dynamically calculated.

In addition to the above dynamic calculation, the number of power supplies that are presently up, referred to as "n," is also dynamically tracked 416. Keeping track of n may be performed, for example, using the supply state tracking registers 208 described above in relation to FIG. 2.

In accordance with an embodiment of the invention, using the above dynamic values for N and n, a dynamic margin of safety, referred to as "x," may be calculated 418. The calculation of x may be accomplished using logic circuitry within the power subsystem and may be performed in accordance with this equation: x=n−N. The dynamic margin of safety x represents the number of power supplies that may be lost before reaching N. In other words, the dynamic margin of safety x represents the present number of "extra" power supplies which are up at a particular time and which provide the redundancy of the power subsystem.

The dynamic margin of safety x is tracked to provide a more realistic measure of the power supply redundancy. In one embodiment, if the dynamic margin of safety x reaches 420 a minimum acceptable level $x_{min}$, then an alarm or alert signal may be generated. The alert signal may indicate that intervening action is to be taken 422 to increase the margin of safety. Otherwise, the method keeps on dynamically tracking N and n. In one implementation, $x_{min}$ may be set to zero such that $x=x_{min}$ when an n=N condition occurs. In another implementation, $x_{min}$ may be set to be one, two, or more such that $x=x_{min}$ when an $n=N+x_{min}$ condition occurs. The action taken 422 may comprise, for example, hot swapping or cold swapping of a failed component. In some circumstances, the action taken may be to add one or more power supplies to the power subsystem.

The above-described apparatus and method addresses problems with the existing power redundancy methods by determining dynamically (at run time) what redundancy level is presently being experienced. This advantageously results in less intervention and potentially greater system uptime. For example, if the design creates an initial margin of safety of x which is greater than two, it becomes far less likely for multiple power supplies to fail over the life of a system box than it is for just one to fail. If the probability that a single power supply will fail over the lifetime of the box is defined as "p," then the probability that x supplies will fail over the lifetime of the box should be p raised to the x power. Consider a hypothetical example where the power subsystem is designed with x=4 and where p=10%. In this case, assuming the power subsystem is configured with $x_{min}=0$, then the probability that action will need to be taken 422 becomes $p^4=0.0001=0.01\%$.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of providing dynamic power redundancy for a system, the method comprising:
   tracking a number of power supply units, n, that are presently in an up state;
   determining dynamically a number of power supply units, N, that are presently needed to supply power to the system;
   generating an action alert to increase a margin of safety corresponding to a difference between n and N if the margin of safety reaches a minimum acceptable level;
   measuring an actual electrical current used while the system is online to generate an analog current measurement signal;
   converting the current measurement signal to digital current measurement data; and
   utilizing the current measurement data in the dynamic determination of N,
   wherein N is calculated by dividing a measure of current drawn by the system over a specified period of time by a maximum current per power supply and rounding up.

2. The method of claim 1, wherein the measure of current drawn by the system comprises a peak current drawn by the system.

3. The method of claim 1, wherein the tracking of n is performed using supply state tracking registers coupled to the power supply units.

4. The method of claim 1, wherein the minimum acceptable level for the margin of safety comprises zero units.

5. The method of claim 1, wherein the minimum acceptable level for the margin of safety comprises more than zero units.

6. The method of claim 1, wherein action taken in response to said action alert comprises hot swapping of a failed component.

7. The method of claim 1, wherein action taken in response to said action alert comprises cold swapping of a failed component.

8. The method of claim 1, further comprising:
   determining an initial value of N at design time based on expected power needs of the system.

9. The method of claim 8, further comprising:
   configuring the system with an initial margin of safety.

10. A power subsystem for providing dynamic power redundantly to system hardware, the power subsystem comprising:
    means for tracking a number of power supply units, n, that are presently in an up state;
    means for determining dynamically a number of power supply units, N, that are presently needed to supply power to the system hardware;
    logic circuitry for generating an action alert to increase a margin of safety corresponding to a difference between n and N if the margin of safety reaches a minimum acceptable level;
    means for measuring an actual electrical current used while the system hardware is online to generate an analog current measurement signal;
    means for converting the current measurement signal to digital current measurement data; and
    means for utilizing the current measurement data in the dynamic determination of N,
    wherein N is calculated by dividing a measure of current drawn by the system hardware over a specified period of time by a maximum current per power supply and rounding up.

11. The power subsystem of claim 10, wherein the measure of current drawn by the system hardware comprises a peak current drawn by the system hardware.

12. The power subsystem of claim 10, wherein the tracking of n is performed using supply state tracking registers coupled to the power supply units.

13. The power subsystem of claim 10, wherein the minimum acceptable level for the margin of safety comprises zero units.

14. The power subsystem of claim 10, wherein the minimum acceptable level for the margin of safety comprises more than zero units.

* * * * *